United States Patent Office 2,742,405
Patented Apr. 17, 1956

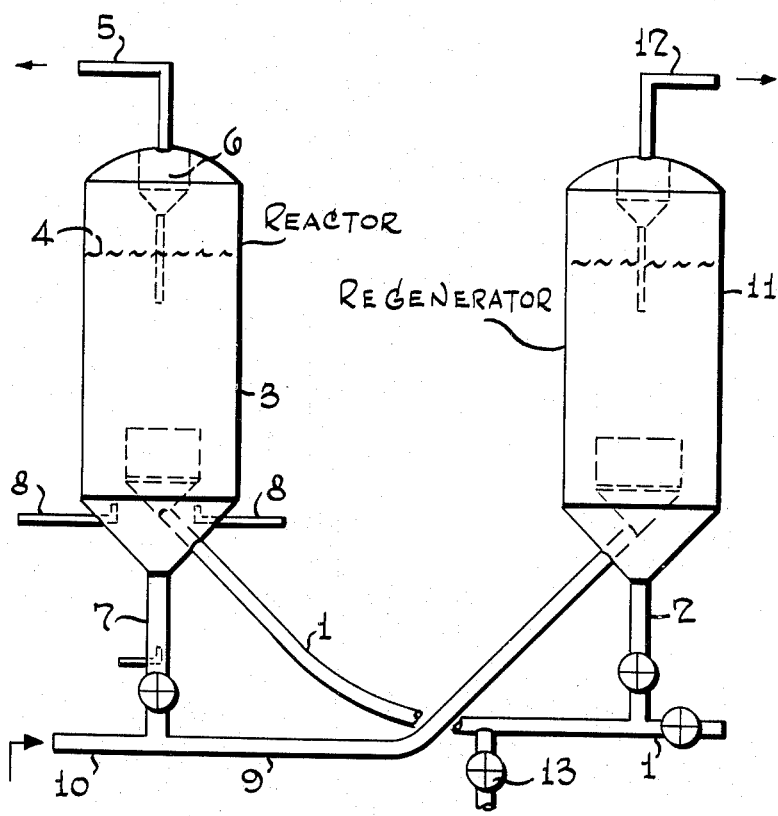

2,742,405

CATALYTIC CONVERSION OF CONTAMINATED HYDROCARBONS

William J. Mattox, Baton Rouge, La., assignor to Esso Research and Engineering Company, a corporation of Delaware Application December 19, 1951, Serial No. 262,427

4 Claims. (Cl. 196—52)

The present invention relates to a catalytic process for converting hydrocarbon oils. More particularly it relates to a method for reducing catalyst contamination resulting from the decomposition of oil-soluble metal contaminants, and the like, especially in cracking processes employing the so-called fluid solid technique. The essence of the invention is that freshly regenerated catalyst is contacted with a relatively small amount of an oil of low contaminant content shortly before the principal, more highly contaminated feed oil is mixed with the catalyst.

When hydrocarbon oils are conventionally cracked in the presence of catalyst, it is well known that the catalyst gradually loses its activity. This is due in part to the incidental conversion of some hydrocarbons to so-called coke and in part to the deposition of mineral contaminants carried in the oil feed. Such contaminants may be in part filtrable, for instance, tank scale picked up by the oil during transit or storage. However, the contaminants by far the most harmful to catalyst activity are unfiltrable inorganic salts, naturally occurring soluble organo-metallic salts, especially those of vanadium, nickel and iron, as well as organic iron salts formed by corrosion of conduits by organic acids present in the oil. While the coke deposit on the catalyst can be kept within permissible limits by periodic combustion, the mineral contaminants carried in the hydrocarbon feed stock tend to accumulate on the catalyst continually without any convenient way of removal. This, of course, permanently reduces the desired cracking activity of the catalyst and can be overcome only by replacing contaminated with fresh catalyst at a suitable rate.

Various physical and chemical treatments have been proposed heretofore for lowering the contaminant content of catalytic feed stocks, in order to reduce catalyst contamination. Some of these processes have succeeded at least partially in this purpose, but have been rather cumbersome in requiring treatment of the entire feed stock.

It is the main object of the present invention catalytically to crack normally liquid hydrocarbons containing mineral contaminants, without the need for desalting or otherwise decontaminating the entire feed. Another object is to reduce catalyst deactivation normally caused by mineral components of the oil feed during catalytic cracking. These and other objects, as well as the nature and scope of the invention, will become more clearly apparent from the subsequent specification and claims.

When liquid hydrocarbons such as gas oil are cracked in the presence of a porous catalyst, it is customary in fluid as well as in other conventional cracking processes to mix relatively cool feed with hot catalyst, for instance, catalyst which had just been regenerated by burning off coke deposited thereon in a previous conversion cycle. When such catalyst passes the point of feed oil injection, it appears that a portion of the catalyst particles receives a disproportionately large deposit of oil and this layer of oil may be sufficient to cool these catalyst particles below the vaporization temperature of the feed. Liquid oil may then be drawn into the pores of the catalyst by capillary action while excess oil is transferred to other particles. The temperature of the cooled particles is then gradually increased back to the desired level by heat transfer from other particles which were not cooled to the same extent, and thus the oil is eventually vaporized and heated to conversion temperature.

Any mineral constituents which the feed oil may have contained in the form of oil-soluble metal salts or as a fine dispersion, are thus carried inside the pores of the cooled catalyst particles, and the coarser contaminants may be filtered out on the catalyst surface. Later, when the hydrocarbons are eventually vaporized and cracked, all these mineral contaminants are left embedded in and on the catalyst. Each time a catalyst particle contacts a sufficient quantity of cool, contaminated oil, this contamination process is repeated, and increasing amounts of contaminants are deposited in the catalyst pores.

It has now been discovered that such contamination can be effectively reduced when hot catalyst is first contacted with a feed relatively free of mineral constituents. This initial addition of oil may result in an immediate filling of the internal pore structure of the catalyst with clean oil by the aforementioned mechanism, the proportion of catalyst so impregnated depending upon the relative amount of substantially contaminant-free oil available. In any event, upon addition of the oil, the catalyst particles become surrounded by expanding vapors of the added oil.

After allowing a short time for the added clean oil to become more or less homogeneously distributed throughout the catalyst, but substantially before complete vaporization of the oil, the main portion of the hydrocarbon feed stock, which comprises the more highly contaminated oil is injected into the catalyst downstream from the point where the relatively pure oil was injected. Since this pure oil at this point is still in the process of vaporizing out of and away from the catalyst, and some of the pure oil may still be liquid within the catalyst pores, the contaminated oil is kept from penetrating into the catalyst pore structure. Instead, the contaminated oil is vaporized from the outer surfaces of the catalyst particles without ever penetrating into the catalyst pores. As a result, when the contaminated feed is finally vaporized the metallic contaminants either form separate extremely fine dust particles or they are loosely deposited on the outer catalyst surfaces. Subsequently, these undesirable materials may be removed from the surface of the cracking catalyst by attrition to which the catalyst is ordinarily subjected in the course of the conversion and regeneration process, and are largely lost from the system in the form of fines.

Since it is common in commercial practice to treat a mixture of feed stocks of various origin in a single cracking unit, suitable quantities of low-contaminant feed for this operation may be readily obtained by proper segregation of relatively pure and contaminated feed stocks, or by treating a relatively minor proportion of the total contaminated feed to remove mineral constituents therefrom by any known procedures, such as heat treatment followed by filtration. Instead of using pure fresh feed for impregnating the catalyst in the first step of this process, it is also feasible to substitute therefor a relatively pure cycle stock, such as gas oil recovered from the process itself.

A specific embodiment illustrating the present invention is described hereafter with reference to the attached drawing which represents diagrammatically a typical system wherein the present invention may be practiced.

Referring to the drawing, gas oil boiling between about 400 to 700° F. and containing up to about 1 to 2 lbs. of soluble and insoluble ash per 1000 barrels is introduced into line 1, at a relatively low temperature of about 70 to 200° F. Hot regenerated cracking catalyst such as a conventional silica-alumina gel is discharged into line 1 from standpipe 2 at a temperature of about 1000 to 1100° F. and in a ratio of about 16 lbs. per lb. of clean hydrocarbon feed introduced through line 1.

As the relatively cool feed contacts the hot catalyst the latter is cooled somewhat and absorbs some of the clean liquid feed into its pores. Before or during vaporization of the clean feed, but before its substantial cracking, a stream of relatively contaminated gas oil boiling between about 400 to 950° F. and containing about 6 to 10 lbs. of soluble and insoluble ash per 1000 barrels is injected into line 1 through feed line 13, preferably after being preheated to about 400 to 700° F. Accordingly, depending on the ratio of catalyst to first-injected oil, as well as on other factors such as the temperature difference between the two materials and on the volatility of the first oil, the interval between injecting catalyst from standpipe 2 into the clean oil in line 1 and injecting the ash-containing oil into line 1 may range from about 0.3 to 2 or more seconds.

The amount of relatively contaminated gas oil may be, for example, about equal to the amount of clean oil previously added, thus bringing the catalyst-to-oil weight ratio in the resulting mixture to about 8. All hydrocarbons present are then rapidly vaporized by the sensible heat of the catalyst and the mixture is passed as a suspension of catalyst particles in hydrocarbon vapors into reactor 3 via a customary distributing cone and grid. The velocity of the dilute catalyst suspension in line 1 may be in the range of about 5 to 30 feet per second.

In reactor 3 the catalyst is maintained as a dense, turbulent bed having an upper level 4 while the hydrocarbon vapors pass upwardly through the reactor at a superficial gas velocity of about 2 to 3 feet per second. While passing through reactor 3 at about 900° F., the hydrocarbon vapors are cracked and the cracked products are finally withdrawn through line 5 after passage through cyclone 6 wherein entrained catalyst particles may be separated and returned to the dense fluid bed. Spent catalyst is withdrawn downwardly from reactor 3 through standpipe 7, preferably after stripping by means of steam admitted through lines 8.

The catalyst from standpipe 7 is passed into transfer line 9 where it is mixed with an oxygen-containing gas such as air admitted at 10 and the resulting suspension of catalyst in air is passed through line 9 at a velocity of about 5 to 50 feet per second into regenerator 11. In the regenerator coke deposited on the spent catalyst is burned off in the usual manner at temperatures of about 1100° F. while the catalyst is again maintained as a dense fluidized bed. Higher temperature of up to about 1250° F., or even higher in the case of activated carbon, may be used depending on the deactivation temperature of the particular catalyst used. Flue gas is removed via line 12 while regenerated catalyst is withdrawn downwardly through standpipe 2 and mixed with fresh clean feed in line 1 as previously mentioned.

Since mineral contaminants in this process are deposited principally on the surface of the catalyst particles, these contaminants are preferentially ground off by attrition normally occurring in the fluidized beds of the reactor and the regenerator and the resulting fines may be allowed to escape from the system via lines 5 and 12. When desired such attrition may be purposely favored by installation of various well-known types of high velocity gas jets in the dense fluidized catalyst beds.

Having described the general nature of the invention as well as an exemplary manner of using it, it will be understood that its scope is not limited thereto. For instance, the clean feed or guard oil need not be a gas oil, but may be some other oil boiling between about 300 to 1100° F., preferably between 500 and about 700° F. For instance, the guard oil may be a naphtha or a vacuum distillation overhead. Also, especially where a relatively heavy guard oil is used, or where a high ratio of clean to contaminated oil is available, the liquid guard feed may also be preheated before being mixed with the catalyst, as long as enough liquid is left to impregnate the catalyst as described before.

Clean oil having a total ash content of about 2–3 lbs./1000 barrels (0.001–0.0015 wt. percent) or less is desirable for best results. However, any relatively clean oil having an ash content of about 3–5 lbs./1000 barrels less than that of the high ash feed will usually produce significant improvements. When not otherwise available, the desired low ash content feed may be obtained by filtration of a high-ash stock, whereby the ash content can often be greatly reduced, leaving only the soluble metal compounds in the oil. Since contaminants vary widely in their effectiveness in impairing selectivity even when present in a given concentration, similar or additional advantages can be obtained in accordance with the present invention if the more powerful catalyst poisons are present in the second or so-called more highly contaminated feed.

The relatively impure or high-ash feed also may have different characteristics than those specifically described in the example. For instance, the ash content may range from about 5 to 10, or as high as 40 lbs. per 1000 barrels, such high values being especially encountered when petroleum or phenol extract is used as a catalytic cracking feed stock.

The weight ratio of catalyst to total hydrocarbon feed in the feed line passing to the catalytic reactor may range between about 5:1 and 20:1, preferably between 7:1 and 15:1.

The weight ratio of guard feed to high-ash feed preferably is greater than 1:4, ratios greater than 1:2 being especially preferred.

It will be understood that the weight ratio of catalyst to guard feed alone may range from about 50:1 to about 5:1, relatively high ratios of catalyst to guard oil being necessary when the amount of guard oil available is small compared with the amount of high-ash feed stock which is to be cracked. Indeed, when the catalyst-to-guard oil ratio is so high as to result in a mixture having poor flow characteristics, it may be desirable to inject an appropriate amount of an inert fluidizing gas such as steam or even water into the feed line along with the guard oil.

The catalyst used may be any known porous cracking catalyst. For instance, besides silica-alumina, it is possible to use other synthetic composite gels such as silica-magnesia or natural clays, especially acid-treated clays. Such catalysts may have a pore volume of about 0.15 to 1.5 cc. per gram. When operating in a so-called "fluid" system, for which the invention is particularly suited, the catalyst may range in particle size up to about 150 microns or higher. Reaction temperatures in the catalytic cracking zone may range from about 800 to 1000° F., all of which is well-known in the art. Accordingly, a detailed description of the actual operation of the conversion zone need not be detailed here, it being understood that this invention relates principally to a novel step of feeding segregated low-ash and high-ash feed stock to the conversion zone, whereas the subsequent cracking step as well as the circulation of catalyst through the system is carried out in accordance with previously known practice. Of course, besides operating in a "fluid" system as illustrated, the invention may also be similarly applied to so-called moving bed systems wherein a coarse granular catalyst is circulated.

Still other variations and modifications of the invention may become apparent to those skilled in the art without departing from the present teaching for which protection by Letters Patent is being secured within the full scope of the appended claims.

I claim:

1. In a process for reducing catalyst contamination resulting from the decomposition of oil soluble contaminants during catalytic cracking of high boiling hydrocarbon oils having an ash content of more than about 4 lbs. per 1000 barrels of oil and containing an appreciable amount of oil soluble organo-metallic compounds as a catalyst poisoning contaminant, which comprises mixing finely divided porous, silicious cracking catalyst at a temperature above about 900° F. with a cool relatively clean and relatively uncontaminated liquid hydrocarbon oil boiling above about 400° F. to thereby at least partially fill the pores of said catalyst with the liquid hydrocarbon, then quickly adding said highly contaminated hydrocarbon oil containing an appreciable amount of said oil soluble organo-metallic catalyst poisoning compounds to said catalyst before said relatively clean liquid hydrocarbon oil has become completely vaporized, then vaporizing said clean and highly contaminated hydrocarbon oils in the mixture to form a dilute suspension of finely divided catalyst in hydrocarbon vapors, passing the resulting suspension to a cracking zone where said catalyst is maintained as a dense, fluidized bed by upflowing gasiform material at a temperature above about 800° F., and wherein the hydrocarbon oils are cracked into lighter products, removing cracked hydrocarbon vapors from said cracking zone, withdrawing spent catalyst from said cracking zone and passing the withdrawn catalyst to a regeneration zone after mixing with an oxygen-containing gas, maintaining said catalyst in said regeneration zone as a dense, turbulent bed at a temperature above about 1000° F. to burn off coke and to grind off metallic catalyst poisoning contaminants deposited on the surface of the catalyst particles as a result of cracking oil soluble organo-metallic compounds in said highly contaminated hydrocarbon oil, withdrawing a stream of flue gas and contaminant-containing fines from said regeneration zone and withdrawing regenerated catalyst from said regeneration zone for mixing with said hydrocarbon oil feeds to be cracked in said cracking zone.

2. A process for reducing catalyst contamination resulting from the decomposition of oil soluble contaminants during catalytic cracking of high boiling highly contaminated hydrocarbon oils containing an appreciable amount of oil soluble organo-metallic compounds as a catalyst poisoning contaminant, which comprises first contacting porous, silicious cracking catalyst at a temperature above about 900° F. with a cool relatively clean and relatively uncontaminated liquid hydrocarbon oil boiling above about 400° F. to thereby at least partially fill the pores of said catalyst with the relatively clean hydrocarbon oil, then quickly adding said highly contaminated hydrocarbon oil containing an appreciable amount of said oil soluble organo-metallic catalyst poisoning compounds to said catalyst before said relatively clean liquid hydrocarbon oil has become completely vaporized, then vaporizing and cracking said relatively clean hydrocarbon oil and said highly contaminated hydrocarbon oil at a temperature above about 800° F. in a cracking zone to form lighter cracked hydrocarbon vaporous products, removing the cracked vaporous hydrocarbon products from said cracking zone, withdrawing spent catalyst from said cracking zone and passing the withdrawn catalyst to a regeneration zone and contacting it there with an oxygen-containing gas, maintaining the catalyst in said regeneration zone at a temperature above about 1000° F. to burn off coke and moving said catalyst through said regeneration zone to grind off catalyst poisoning metallic contaminants deposited on the surface of said catalyst as a result of cracking oil soluble organo-metallic compounds in said highly contaminated hydrocarbon oil, withdrawing a stream of flue gas and contaminant-containing fines from said regeneration zone and withdrawing regenerated catalyst from said regeneration zone for mixing first with fresh relatively clean hydrocarbon oil and then with highly contaminated hydrocarbon oil being passed to said cracking zone.

3. A process for reducing catalyst contamination resulting from the decomposition of oil soluble contaminants during catalytic cracking of high boiling highly contaminated hydrocarbon oils having an ash content of more than about 4 lbs. per 1000 barrels of oil and containing oil soluble organo-metallic compounds as a catalyst poisoning contaminant, which comprises first contacting porous, silicious cracking catalyst at a temperature above about 900° F. with a cool relatively clean and uncontaminated liquid hydrocarbon oil boiling above about 400° F. and having an ash content of less than about 2 lbs. per 1000 barrels of oil to thereby at least partially fill the pores of said catalyst with the relatively clean hydrocarbon oil, then quickly adding said highly contaminated hydrocarbon oil containing more than about 4 lbs. of ash per 1000 barrels of oil feed and containing an appreciable amount of said oil soluble organo-metallic catalyst poisoning compounds to said catalyst before said relatively clean liquid hydrocarbon oil has become completely vaporized and thereby prevent said highly contaminated oil from penetrating the pores of said catalyst, the weight ratio of the relatively clean hydrocarbon oil to the highly contaminated hydrocarbon oil being greater than 1:4, then vaporizing and cracking said relatively clean hydrocarbon oil and said highly contaminated hydrocarbon oil at a temperature between about 800° and 1000° F. in a cracking zone to form lighter cracked hydrocarbon vaporous products, removing the cracked vaporous hydrocarbon products from said cracking zone, withdrawing spent catalyst from said cracking zone and passing the withdrawn catalyst to a regeneration zone and contacting it there with an oxygen-containing gas, maintaining the catalyst in said regeneration zone at a temperature between about 1000° and 1250° F. to burn off coke and moving said catalyst through said regeneration zone to grind off catalyst poisoning metallic contaminants deposited on the surface of said catalyst as a result of cracking oil soluble organo-metallic compounds in said highly contaminated hydrocarbon oil, withdrawing a stream of flue gas and contaminant-containing fines from said regeneration zone and withdrawing regenerated catalyst from said regeneration zone for mixing first with fresh relatively clean hydrocarbon oil and then with highly contaminated hydrocarbon oil being passed to said cracking zone.

4. A process for reducing catalyst contamination resulting from the decomposition of oil soluble contaminants during catalytic cracking of higher boiling highly contaminated hydrocarbon oils having an ash content of more than about 4 lbs. per 1000 barrels of oil, and containing oil soluble organo-metallic compounds as a catalyst poisoning contaminant, which comprises first contacting porous, silicious cracking catalyst at a temperature above about 900° F. with a cool relatively clean and uncontaminated liquid hydrocarbon oil boiling above about 400° F. and having an ash content of less than about 2 lbs. per 1000 barrels of oil to thereby at least partially fill the pores of said catalyst with the relatively clean hydrocarbon oil, then within about 0.3 to 2 seconds after contacting said catalyst with said clean relatively uncontaminated hydrocarbon oil adding said highly contaminated hydrocarbon oil containing more than about 4 lbs. of ash per 1000 barrels of oil feed and containing said oil soluble organo-metallic catalyst poisoning compounds to said catalyst before said clean and uncontaminated liquid hydrocarbon oil has become completely vaporized and thereby prevent said highly contaminated oil from penetrating the pores of said catalyst, the weight ratio of the relatively uncontaminated clean hydrocarbon oil to the highly contaminated oil being greater than 1:2, then vaporizing and cracking said relatively clean hydrocarbon oil and said highly contaminated hydrocarbon oil at a temperature between about 800° and 1000° F. in a cracking zone to form lighter cracked hydrocarbon vaporous products, removing the cracked vaporous hydrocarbon products from said cracking zone, withdrawing spent catalyst from said cracking zone and passing the withdrawn catalyst to a regeneration zone and contacting it there with an oxygen-containing gas, maintaining the catalyst in said regeneration zone at a temperature between about 1000° and 1250° F. to burn off coke and moving said catalyst through said regeneration zone to grind off metallic catalyst poisoning contaminants deposited on the surface of said catalyst as a result of cracking oil soluble organo-metallic compounds in said highly contaminated hydrocarbon oil, withdrawing a stream of flue gas and contaminant-containing fines from said regeneration zone and withdrawing regenerated catalyst from said regeneration zone for mixing first with relatively clean hydrocarbon oil and then with highly contaminated hydrocarbon oil being passed to said cracking zone.

References Cited in the file of this patent
UNITED STATES PATENTS

| | | |
|---|---|---|
| 2,425,532 | Hemminger | Aug. 12, 1947 |
| 2,461,958 | Bonnell | Feb. 15, 1949 |
| 2,651,600 | Taff et al. | Sept. 8, 1953 |

OTHER REFERENCES

"Aging of Cracking Catalyst," G. A. Mills, Inc. and Eng. Chem., vol. 42, pages 182–87, January 1950.